Dec. 13, 1938.  W. F. EISENHAUER  2,139,738
MEANS FOR LUBRICATING SPRINGS
Filed Feb. 12, 1936
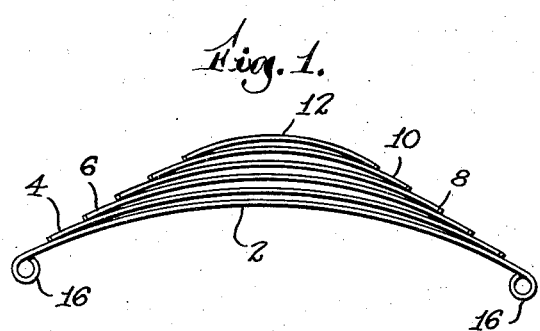
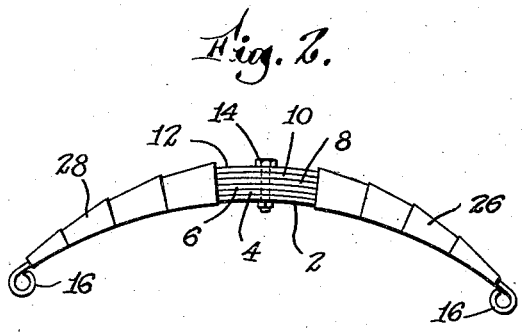
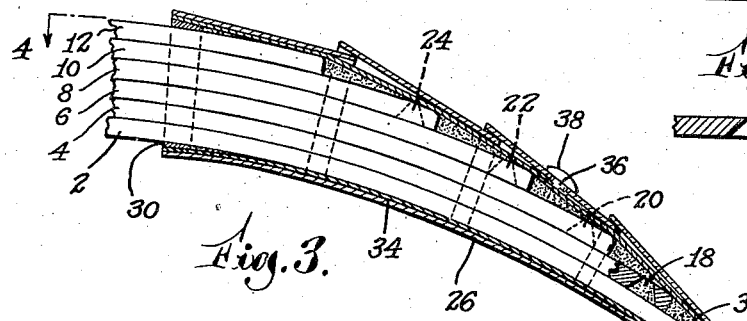
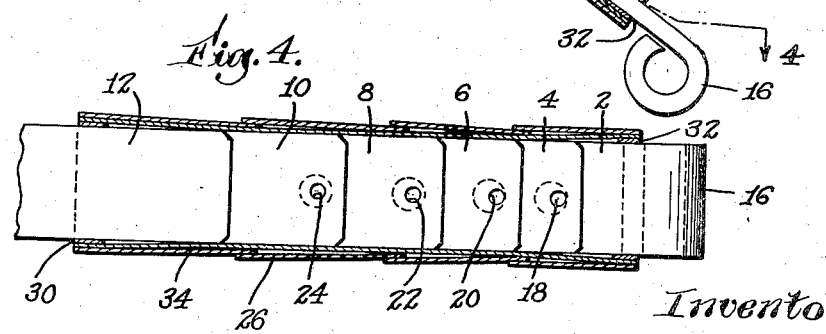
Inventor
Warren F. Eisenhauer
by Charles Y. Chittick
Attorney Patented Dec. 13, 1938

2,139,738

UNITED STATES PATENT OFFICE 2,139,738

MEANS FOR LUBRICATING SPRINGS

Warren F. Eisenhauer, Watertown, Mass., assignor, by mesne assignments, to F. L. Jacobs Company, Detroit, Mich., a corporation of Michigan Application February 12, 1936, Serial No. 63,606

1 Claim. (Cl. 267—37)

This invention pertains to leaf springs of the type commonly used on automobiles, and is particularly concerned with the problem of lubricating leaf springs to eliminate squeaks.

Another object of the invention is to provide a simple means in the spring leaves themselves to enable a lubricant to be supplied continuously to the moving spring leaves.

Still another object is to provide a cover for the spring by means of which a lubricant may be forced to the desired points.

The accomplishment of these and other objects will become apparent as the explanation of my invention proceeds with the aid of the accompanying drawing in which Fig. 1 shows an unassembled leaf spring.

Fig. 2 shows the spring assembled with articulated covers thereon.

Fig. 3 is a longitudinal cross section of one end of the covered spring shown in Fig. 2.

Fig. 4 is a plan view on the line 4—4 of Fig. 3.

Figs. 5, 6, 7 and 8 are cross-sectional views of individual spring leaves showing various lubricating hole formations.

In Fig. 1 is shown an unassembled leaf spring composed of a main leaf 2 and the progressively shorter leaves 4, 6, 8, 10 and 12. In the formation of the leaves of springs of this type, it is customary to decrease the radius of curvature on the shorter leaves, and such construction is apparent in Fig. 1. Obviously, when the leaves 2, 4, 6, 8, 10 and 12 are assembled and bound together by a bolt 14, (see Fig. 2) the ends of the several leaves will press with great force on the adjoining leaves.

Because of this heavy frictional engagement between the ends of each leaf and the adjoining longer leaf, it happens in practically all cases that an unpleasant squeaking develops when the spring is flexed, because the engaging surfaces are not perfectly smooth. Substantially all of the squeaking develops at the leaf ends where the pressure is at a maximum and the movement between the adjoining leaves is the greatest.

Many means have been tried to overcome this fault, but at best they have proved to be only temporary expedients.

By my invention, I provide means to permanently cover the spring to prevent dirt and water from disturbing the action of the spring leaves, and at the same time provide means for introducing and retaining a lubricant on and between spring leaves in such a way that squeaks are eliminated. By my invention I also provide means whereby the lubricant may be replenished when necessary without the necessity of removing the spring casing.

In brief, my invention consists of a spring in which the spring leaves have holes in their ends at the area of maximum pressure, in combination with an articulated metal spring cover of the type capable of sustaining substantial, internal lubricant pressure, whereby the lubricant may be forced into the holes.

Referring now to Fig. 3 which shows a cross-sectional view of my invention, there is a main leaf 2 having an eye 16 at its end for connection with the spring shackle. Positioned successively above leaf 2 are the progressively shorter leaves 4, 6, 8, 10 and 12. Leaves 4, 6, 8 and 10 have near their ends the holes 18, 20, 22 and 24 respectively. These holes are located preferably mid-way of the width of the spring leaves, as shown in Fig. 4, and at or about the point of greatest pressure between the engaging leaves, but may be any place in that portion of the leaf between the end and the end of the adjoining shorter leaf. The formation of the holes 18, 20 22 and 24 may be as shown in Figs. 5, 6, 7 and 8. The holes may be of any desired diameter, provided they are of sufficient size to readily admit lubricants under pressure, and provided further, that they are not of such size that the strength of the spring end is endangered due to removal of too much metal. Preferably the holes should be countersunk or chamfered, as shown in Figs. 3, 4, 5, 7 and 8, to give the best results. A similar hole may be incorporated in the ends of leaf 12, if desired or if necessary, due to leaf 12 squeaking. Usually, however, it would be unnecessary since the squeaking is generally caused by the longer leaves which have greater movement.

Positioned about the ends of the spring are articulated covers 26 and 28. These covers are preferably made of thin sheet metal and are in common use on automobiles at the present time. A typical cover suitable for use in connection with my invention is shown by the United States patent to Skok, No. 1,284,482. As shown in Fig. 3, the cover used in connection with my invention is composed of a plurality of sections which may move relative to one another when the spring is flexed. At each end of the cover is a sealing member 30 and 32, usually of felt, for the purpose of making the cover substantially grease-tight at each end. The articulated points of the cover fit closely so as to be substantially grease-tight. Preferably between the cover and the spring is a liner 34, usually of fabric, to assist in the retention of grease about the spring leaves.

By means of the combination of elements just described, namely, the spring leaves with the holes in their several ends, and the grease-tight, articulated, metal spring cover positioned thereon, it is possible to pump a lubricant 35 into the cover through the hole 36 and liner 34 by means of a tool of the type shown in the United States patent to Eisenhauer et al., No. 2,003,709, under such pressure that the grease 35 will distribute itself about the spring leaves and enter into the holes 18, 20, 22 and 24. After a sufficient amount of grease or lubricant has been pumped into the cover to reach all the desired places, the hole 36 is sealed by means of the plug 38.

It will be apparent that when the spring is flexed there will be movement between the several leaves, the greatest movement being between the end of leaf 4 and the main leaf 2, the movement between the shorter leaves being progressively less. Since the lubricating compound which has been pumped within the spring cover has filled holes 18, 20, 22 and 24, it is believed obvious, as the ends of the several leaves move backward and forward and slightly laterally, if under torsion, with relation to the adjoining leaves as the spring is flexed, a thin film of grease or lubricant will gradually spread from the holes 18, 20, 22 and 24 to the heavy pressure contacting areas of the several leaves adjacent the holes 18, 20, 22 and 24. Thus, by my construction, as the lubricant-filled holes shift their position with relation to the adjoining leaves, a thin film of lubricant is enabled to work its way between adjacent leaves at the areas where the leaves are under the greatest pressure, thereby eliminating the squeaks that would ordinarily be present in an unlubricated spring of this type.

As stated before, in my preferred construction, the side of the lubricating hole adjacent the next leaf should be beveled to minimize any wiping action so that the grease or lubricant may more readily work its way between the leaves. However, very satisfactory results have been obtained where the side of the hole is at right angles to the adjoining spring, as shown in Fig. 6.

It should also be pointed out that my invention works equally well in the case where the main spring leaf is on top.

By the foregoing construction, namely, the introduction of holes to the ends of the several spring leaves, when used in combination with a lubricant-tight spring cover of the general type described, it becomes possible not only to initially lubricate the spring after the application of the cover, but also to re-lubricate the springs from time to time thereby effectively eliminating all squeaks without the necessity of removing the cover from the spring.

Having thus described my invention by reference to a specific construction, I wish it to be distinctly understood, however, that I do not intend to limit myself thereby, but only as set forth in the appended claim.

I claim:

In structure of the character described, a spring having a plurality of spring leaves attached together intermediate their ends and having outer end portions of successive leaves overhanging adjacent leaves, an elongated longitudinally flexible open ended casing enclosing said spring, a fluid tight fabric liner for said casing, said liner cooperating with said end portions of said spring leaves to provide a plurality of enclosed spaces for the retention of lubricant, a filler passage opening into one of said spaces, a plurality of passages in said spring end portions, for introducing lubricant from said spaces to the contacting areas of the leaves adjacent said passages, and means surrounding said spring and closing and sealing the ends of said casing.

WARREN F. EISENHAUER.